United States Patent
Kolehmainen et al.

(10) Patent No.: US 8,295,765 B2
(45) Date of Patent: Oct. 23, 2012

(54) SYSTEM AND METHOD OF USING A FIRST APPARATUS AND A SECOND REMOTE APPARATUS

(75) Inventors: Mikko Pekka Pertteli Kolehmainen, Järvenpää (FI); Marko Mikael Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 432 days.

(21) Appl. No.: 12/317,822

(22) Filed: Dec. 29, 2008

(65) Prior Publication Data

US 2010/0167642 A1    Jul. 1, 2010

(51) Int. Cl.
*H04B 5/00*    (2006.01)
(52) U.S. Cl. ....................................... 455/41.1
(58) Field of Classification Search .......... 455/41.1, 455/41.2, 41.3, 419, 420
See application file for complete search history.

(56) References Cited

U.S. PATENT DOCUMENTS

2009/0098825 A1 *    4/2009    Huomo et al. ............... 455/41.1

* cited by examiner

*Primary Examiner* — Steven J Mottola
(74) *Attorney, Agent, or Firm* — Harrington & Smith

(57) ABSTRACT

An apparatus and method of controlling an apparatus, the apparatus including: a near field communication transceiver configured to enable a near field communication link to be established with a remote apparatus; a user interface configured to enable a user to input information into the apparatus wherein the input information enables control of the remote apparatus and the user interface is also configured to provide an indication of how the input information may be used to control the remote apparatus; and a transmitter configured to send data dependent upon the input information to the remote apparatus to enable the input information to be used to control the remote apparatus.

21 Claims, 5 Drawing Sheets

SYSTEM AND METHOD OF USING A FIRST APPARATUS AND A SECOND REMOTE APPARATUS

FIELD OF THE INVENTION

Embodiments of the present invention relate to a system and method of using the system. In particular, they relate to a system and method of using a system comprising a first mobile apparatus and at least one second apparatus remote from the first apparatus.

BACKGROUND TO THE INVENTION

Electronic apparatus are well known. An electronic apparatus may have a number of different settings. A user may be able to determine a profile for an electronic apparatus by defining preferred settings for the apparatus. It is useful to enable a user to easily configure an apparatus with their preferred profile.

BRIEF DESCRIPTION OF VARIOUS EMBODIMENTS OF THE INVENTION

According to various, but not necessarily all, embodiments of the invention there is provided a system comprising: a first mobile apparatus and a second apparatus where the first mobile apparatus and the second apparatus are remote from each other; the first mobile apparatus comprising a near field communication transceiver configured to enable a near field communication link to be established with the second apparatus, a user interface configured to enable a user to input information into the first mobile apparatus wherein the input information enables control of the second apparatus and the user interface is also configured to provide an indication of how the input information may be used to control the second apparatus and a transmitter configured to send data dependent upon the input information to the second apparatus; and the second apparatus comprising a near field communication transceiver configured to enable a near field communications link to be established with the first mobile apparatus, a receiver configured to receive data from the first mobile apparatus where the received data is dependent upon information input at the first mobile apparatus and a controller is configured to decode the received data to retrieve the information input at the first mobile apparatus and to control the second apparatus in accordance with the retrieved information.

In some embodiments of the invention the first mobile apparatus may be configured to store information for sending with the data dependent upon the input information to enable the input information to be retrieved from the data received at the second apparatus.

In some embodiments of the invention the first mobile apparatus may be configured to convert the input information into data according to a predetermined format to enable the input information to be retrieved from the data received at the second apparatus.

According to various, but not necessarily all, embodiments of the invention there is provided a method comprising: establishing a near field communication link between a first mobile apparatus and a second apparatus, where the first mobile apparatus is remote from the second apparatus; enabling information to be input at the first mobile apparatus to enable control of the remote apparatus; providing an indication to the user of the first mobile apparatus of how the input information may be used to control the second apparatus; sending data dependent upon the input information from the first mobile apparatus to the second apparatus to enable control of the second apparatus: receiving the data dependent upon the input information at the second apparatus; decoding the received data to retrieve the input information; and controlling the second apparatus in accordance with the retrieved information.

In some embodiments of the invention the method may comprise sending information from the first mobile apparatus to the second apparatus to enable the input information to be retrieved from the data received at the second apparatus.

In some embodiments of the invention the method may comprise converting the information input at the first mobile apparatus into data according to a predetermined format to enable the input information to be retrieved from the data received at the second apparatus.

According to various, but not necessarily all, embodiments of the invention there is provided an apparatus comprising: a near field communication transceiver configured to enable a near field communication link to be established with a remote apparatus; a user interface configured to enable a user to input information into the apparatus wherein the input information enables control of the remote apparatus and the user interface is also configured to provide an indication of how the input information may be used to control the remote apparatus; and a transmitter configured to send data dependent upon the input information to the remote apparatus to enable the input information to be used to control the remote apparatus.

In some embodiments of the invention the apparatus may be configured to store information for sending with the data dependent upon the input information to enable the input information to be retrieved from the data received at the remote apparatus.

In some embodiments of the invention the apparatus may be configured to convert the input information into data according to a predetermined format to enable the input information to be retrieved from the data received at the remote apparatus. The apparatus may be configured to store information indicative of the predetermined format. The apparatus may be configured to receive the information indicative of the predetermined format from the remote apparatus.

In some embodiments of the invention the near field communication link may enable a second communication link to be established between the apparatus and the remote apparatus where the second communication link has a longer range than the near field communication link. The data dependent upon the input information may be sent over the second communication link.

According to various, but not necessarily all, embodiments of the invention there is provided a method comprising: establishing a near field communication link between a first apparatus and a second apparatus, where the first apparatus is remote from the second apparatus; enabling information to be input at the first apparatus to enable control of the second apparatus; providing an indication to the user of the first apparatus of how the input information may be used to control the second apparatus; and sending data dependent upon the input information from the first apparatus to the second apparatus to enable the input information to be used to control the second apparatus.

In some embodiments of the invention the method may comprise sending information with the data dependent upon the input information to enable the input information to be retrieved from the data received at the second apparatus.

In some embodiments of the invention the method may comprise converting the input information into data according to a predetermined format to enable the input information to be retrieved from the data received at the second apparatus.

In some embodiments of the invention the method may comprise establishing a second communication link between the first apparatus and the second apparatus where the second communication link has a longer range than the near field communication link. The data dependent upon the input information may be sent over the second communication link.

The apparatus may be for wireless communication.

According to various, but not necessarily all, embodiments of the invention there is provided a computer program comprising computer program instruction means configured to control an apparatus, the apparatus comprising a near field communication transceiver configured to enable a near field communication link to be established with a remote apparatus and a user interface, the program instructions providing, when loaded into a processor; means for enabling information to be input at the apparatus to enable control of the remote apparatus; means for providing an indication to a user of the apparatus of how the input information may be used to control the remote apparatus; and means for sending data dependent upon the input information from the first apparatus to the second apparatus to enable the input information to be used to control the remote apparatus.

In some embodiments of the invention a physical entity embodying the computer program as described above may be provided. In some embodiments of the invention an electromagnetic carrier signal carrying the computer program as described above may be provided.

In some embodiments of the invention the computer program may comprise program instructions for causing a computer to perform the above described methods.

According to various, but not necessarily all, embodiments of the invention there is provided an apparatus comprising: a near field communication transceiver configured to enable a near field communications link to be established with a remote mobile apparatus; a receiver for receiving data from the remote mobile apparatus where the received data is dependent upon information input at the remote mobile apparatus; wherein the controller is configured to decode the received data to retrieve the information input at the remote mobile apparatus and to control the apparatus in accordance with the retrieved information.

In some embodiments of the invention the apparatus may be configured to use information received from the remote mobile apparatus to retrieve the input information from the received data.

In some embodiments of the invention the apparatus may be configured to retrieve the input information from the received data according to a predetermined format. In some embodiments of the invention the information indicative of the predetermined format may be stored in the apparatus.

In some embodiments of the invention the near field communication link may enable a second communication link to be established where the second communication link has a longer range than the near field communication link. The data dependent upon the input information is received over the second communication link.

According to various, but not necessarily all, embodiments of the invention there is provided a method comprising: establishing a near field communication link between a first apparatus and a second apparatus, where the first apparatus is a mobile apparatus remote from the second apparatus; receiving data at the second apparatus, where the data is sent from the first apparatus and is dependent upon information input at the first apparatus; decoding the received data to retrieve the information input at the first apparatus; and controlling the second apparatus in accordance with the retrieved information.

In some embodiments of the invention the method may comprise using information received from the first apparatus to retrieve the input information from the received data.

In some embodiments of the invention the method may comprise retrieving the input information from the received data according to a predetermined format. The information indicative of the predetermined format may be stored in the apparatus.

In some embodiments of the invention the method may comprise establishing a second communication link with the first remote apparatus where the second communication link has a longer range than the near field communication link. The input information may be received over the second communication link.

The apparatus may be for providing an output to a user, for example the apparatus may be for rendering content.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
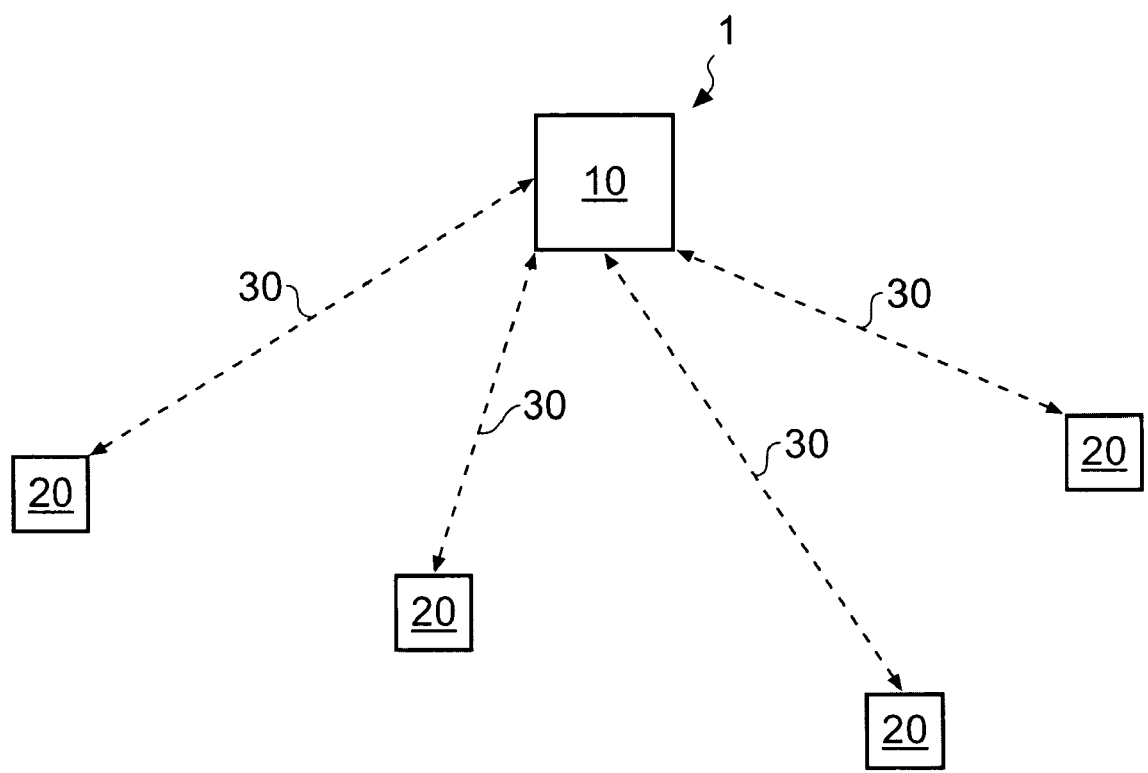
FIG. 1 illustrates a system according to an embodiment of the invention.

The Figures illustrate a system 1 comprising: a first mobile apparatus 10 and a second apparatus 20. The first mobile apparatus 10 and the second apparatus 20 are remote from each other. The first mobile apparatus 10 comprises a near field communication transceiver 19 configured to enable a near field communication link 30 to be established with the second apparatus 20. The first mobile apparatus 10 also comprises a user interface 13 configured to enable a user to input information into the first mobile apparatus 20 wherein the input information enables control of the second apparatus 20. The user interface 13 is also configured to provide an indication of how the input information may be used to control the second apparatus 20. The first mobile apparatus 10 also comprises a transmitter 19, 21 configured to send data dependent upon the input information to the second apparatus 20. The second apparatus 20 comprises a near field communication transceiver 41 configured to enable a near field communications link 30 to be established with the first mobile apparatus 10. The second apparatus 20 also comprises a receiver 41, 43 configured to receive data from the first mobile apparatus 10 where the received data is dependent upon information input at the first mobile apparatus 10. The second apparatus 20 also comprises a controller 35 configured to decode the received data to retrieve the information input at the first mobile apparatus 10 and also configured to control the second apparatus 20 in accordance with the retrieved information.

FIG. 1 illustrates a system 1 according to a first embodiment of the invention. In the illustrated embodiment the system 1 comprises a first apparatus 10 and a plurality of second apparatus 20. The system also comprises communication links 30 between the first apparatus 10 and each of the second apparatus 20.

It is to be appreciated that in other embodiments of the invention the system 1 may comprise different numbers of apparatus 10, 20. For example, in some embodiments of the invention the system 1 may comprise more than one first apparatus 10, in other embodiments of the invention the system 1 may comprise only one second apparatus 20.

The first apparatus 10 may be an electronic apparatus. The first apparatus 10 may be a mobile apparatus 10, that is, the first apparatus 10 may be easily carried by a user. The apparatus 10 may be a handheld apparatus which can be carried in a user's hand, handbag or jacket pocket for example. The apparatus 10 may be, for example, a mobile cellular telephone, a personal computer, a camera, a personal digital assistant or any other apparatus 10 that enables a user to input control information.

Figure 2:
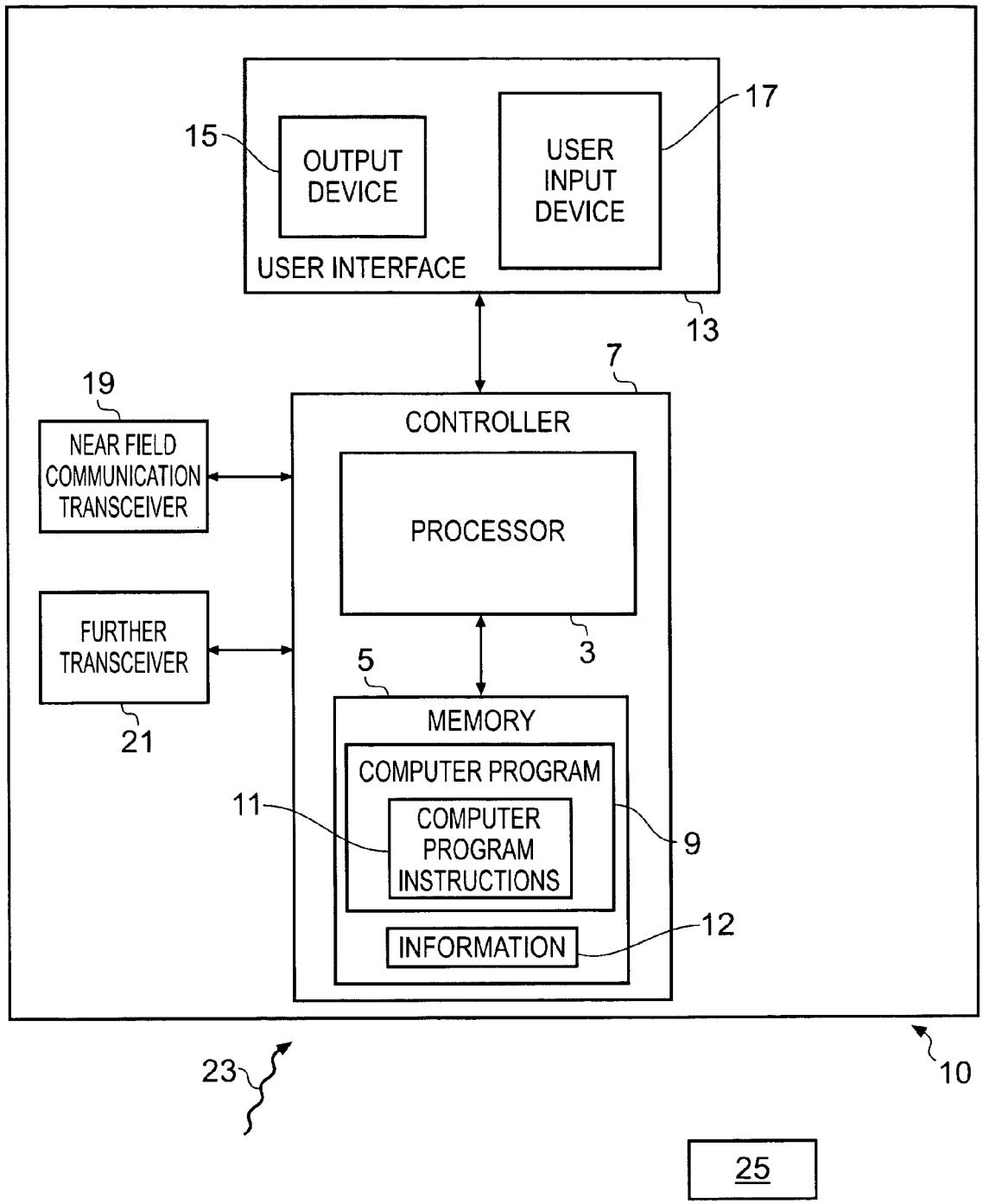
FIG. 2 illustrates a first apparatus of the system of FIG. 1 in more detail.

An example of a first apparatus 10 according to a first embodiment of the invention is illustrated in more detail in FIG. 2.

The second apparatus 20 may be any apparatus which provides an output to a user. The second apparatus 20 may be an electronic apparatus such as a television or a stereo system. Alternatively the second apparatus 20 may be a non-electronic apparatus but may have an electronic controller which controls the output of the apparatus 20. For example the second apparatus 20 may be a sauna or a gas central heating system in which the temperature is controlled by an electronic thermostat.

The second apparatus 20 may be an immobile apparatus. For example the second apparatus 20 may be fixed in position so that it cannot be moved by a user. For example, the second apparatus may be a sauna or a central heating system. The second apparatus may also be an apparatus that is too large or too heavy to be easily moved by a user for example it may be a television or an audio system. In other embodiments of the invention the apparatus 20 may be an apparatus that is not typically moved during use for example it may be an apparatus such as a toaster which is not suitable to be moved in use because it heats up.

In other embodiments of the invention one or more of the second apparatus 20 in the system 1 may be a mobile apparatus 20, for example it may be an apparatus such as a lap top computer.

Figure 3:
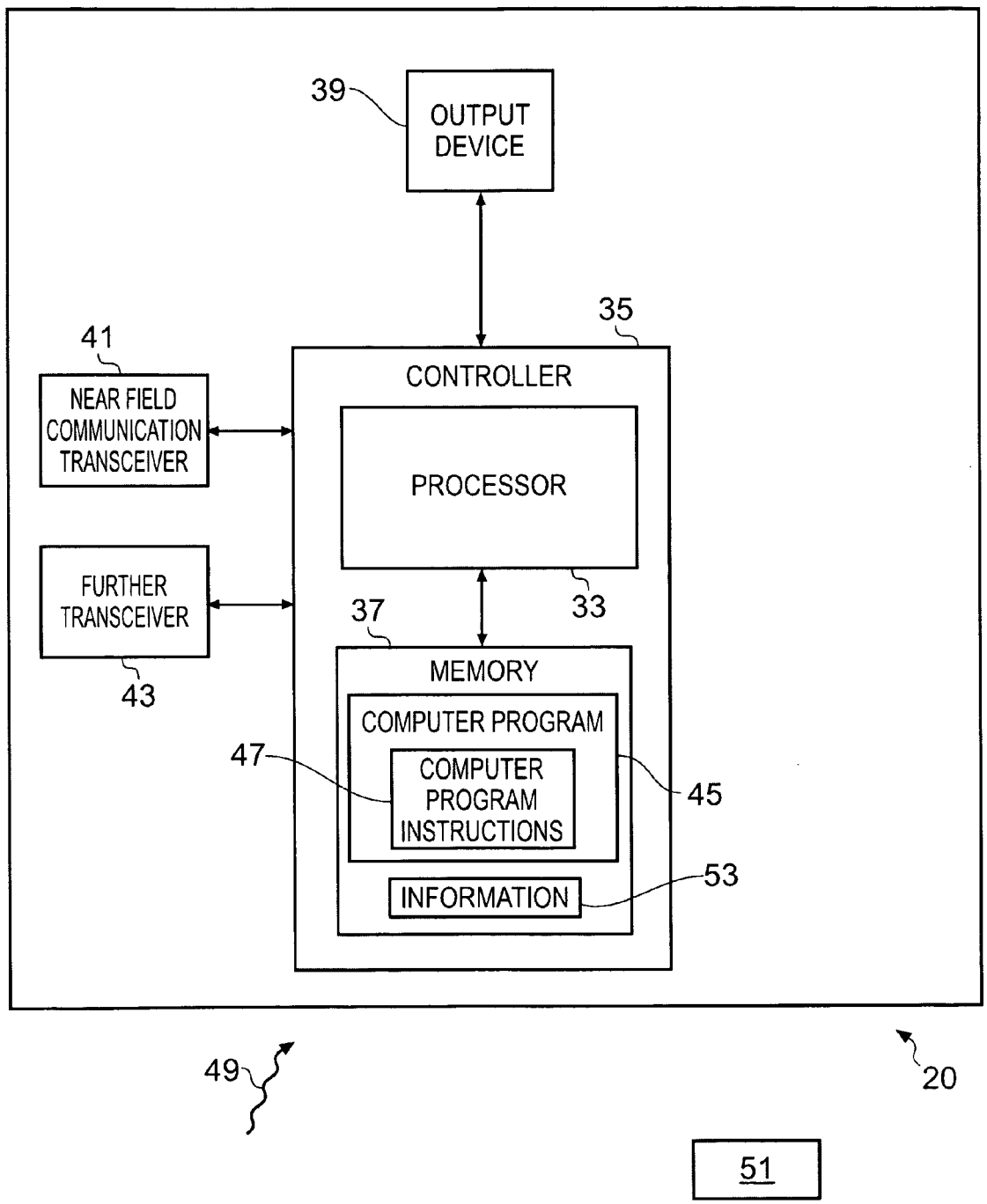
FIG. 3 illustrates a second apparatus of the system of FIG. 1 in more detail.

An example of a second apparatus 20 according to a first embodiment of the invention is illustrated in more detail in FIG. 3.

In the system 1 illustrated in FIG. 1 the first apparatus 10 is remote from the second apparatus 20 in that the first apparatus 10 may only communicate with the second apparatus 20 via the external communication link 30. As the first apparatus 10 may be mobile it may be possible to move the first apparatus 10 so that the location of the first apparatus 10 changes relative to the second apparatus 20.

The communication link 30 may be any external communication link which enables data to be transmitted between the first apparatus 10 and the second apparatus 20. The communication link 30 may be a short range wireless communication link. The communication link 30 may only be established when the first apparatus 10 is moved within a predetermined distance of a second apparatus 20. The communication link 30 may be terminated when the first apparatus 10 is moved further away from the second apparatus 20.

The communication link 30 may be a near field communication link. The near field communication link 30 may be configured to use magnetic field induction to enable data to be transferred between the first apparatus 10 and the second apparatus 20 when the first apparatus 10 is brought within the near field communication range of the second apparatus 20. The communication range of the near filed communication link 30 may be approximately 4 cm. The near field communication link 30 may be configured to operate at a frequency of 13.56 MHz.

In the illustrated embodiment a communication link 30 is illustrated between the first apparatus 10 and each of the second apparatus 20. This indicates that the first apparatus 10 may be configured to establish a communication link 30 with any of the second apparatus 20. It is to be appreciated that there may only be one communication link 30 between the first apparatus 10 and a second apparatus 20 at any one time. For example, in embodiments of the invention where the communication link 30 is a near field communication link 30 it may only be possible for the first apparatus 10 to establish a communication link 30 with one second apparatus 20 at a time because the near field communication link 30 has such a short communication range.

In some embodiments of the invention the system may comprise further communication links to be established between the first apparatus 10 and the second apparatus 20. The further communication link may be any external communication link which enables data to be transmitted between the first apparatus 10 and the second apparatus 20. The further communication link may be a short range wireless communication link, for example the further communication link may be a Bluetooth or wireless local area network (WLAN) link.

The further communication link may be established after a near field communication link 30 has been established. The further communication link may have a longer range than the near field communication link and may enable the transfer of data between the first apparatus 10 and the second apparatus 20 when the first apparatus 10 is moved out of the near field communication range of the second apparatus 20.

FIG. 2 schematically illustrates a first apparatus 10 according to an embodiment of the invention. Only features referred to in the following description are illustrated. It should, however, be understood that the first apparatus 10 may comprise additional features that are not illustrated.

As mentioned above the first apparatus 10 may be an electronic apparatus such as a mobile cellular telephone, a personal computer, a camera or a personal digital assistant.

The illustrated first apparatus 10 comprises: a user interface 13, a controller 7 and a near field communication transceiver 19. In some embodiments of the invention the first apparatus 10 may also comprise a further transceiver 21.

In the illustrated embodiment the controller 7 comprises a processor 3 and a memory 5 and the user interface 13 comprises an output device 15 and a user input device 17.

The controller 7 provides means for controlling the first apparatus 10. The controller 7 may be implemented using instructions that enable hardware functionality, for example, by using executable computer program instructions 11 in a general-purpose or special-purpose processor 3 that may be stored on a computer readable storage medium 25 (e.g. disk, memory etc) to be executed by such a processor 3.

The processor 3 is configured to receive input commands from the user interface 13 and also to provide output commands to the user interface 13. The processor 3 is also configured to write to and read from the memory 5.

The user interface 13 provides means for enabling a user of the first apparatus 10 to input information which may be used to control a second apparatus 20.

The user input device 17 may be any means which enables a user to input information into the first apparatus 10. For example the user input device 17 may be a keypad or a portion of a touch sensitive display or a combination of a number of different types of user input devices.

The output device 15 may be any means which enable an output to be provided to a user of the first apparatus 10. For example, in some embodiments of the invention the output device 15 may comprise a display configured to display information to a user or an audio output device configured to provide information as an audio output or a combination of different types of output devices.

The information presented by the output device 15 may correspond to information which has been input by the user via the user input device 17. This provides confirmation to the user of the information that that they have entered. The information presented may also correspond to information which is stored in the memory 5 or information which has been received by the near field communication transceiver 19 or the further transceiver 21.

The memory 5 stores a computer program 9 comprising computer program instructions 11 that control the operation of the first apparatus 10 when loaded into the processor 3. The computer program instructions 11 provide the logic and routines that enables the first apparatus 10 to perform the methods illustrated in FIG. 4. The processor 3 by reading the memory 5 is able to load and execute the computer program 9.

The computer program instructions 11 may provide computer readable program means for enabling information to be input at the first apparatus 10 to enable control of a second apparatus 20 and provide an indication of how the input information may be used to control the second apparatus 20.

The computer program instructions 11 may also provide computer readable program means for enabling data dependent upon the input information to be sent to the second apparatus 20 to enable the input information to be used to control the second apparatus 20.

The computer program 9 may arrive at the first apparatus 10 via any suitable delivery mechanism 23, 25. The delivery mechanism 23, 25 may be, for example, a computer-readable storage medium, a computer program product 25, a memory device, a record medium such as a CD-ROM or DVD, an article of manufacture that tangibly embodies the computer program 9. The delivery mechanism may be a signal 23 configured to reliably transfer the computer program 9. The first apparatus 10 may propagate or transmit the computer program 9 as a computer data signal.

The memory 5 may also store information 12. The information 12 may comprise information which has been input by a user using the user input device 17 and/or information which has been received by the transceivers 19, 21. The information 12 may also comprise information which may be used to enable the processor 3 to determine how information input by the user may be used to control a second apparatus 20 and control the output device 15 to provide an indication of how the input information may be used to control a second apparatus 20.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device.

The near field communication transceiver 19 may be any means which enables a near field communication link 30 to be established between the first apparatus 10 and a second apparatus 20.

The controller 7 may be configured to provide data to the near field communication transceiver 19 for transmission over the near field communication link 30. The controller 7 may also be configured to decode radio signals received by the near field communication transceiver 19 into information. The received information may be stored in the memory 5. The controller 7 may also be configured to present the information to a user via the output device 15.

The data transmitted via the near field communication transceiver 19 may enable the first apparatus 10 to be identified. The data received by the near field communication transceiver 19 may enable a second apparatus 20 to be identified.

The near field communication transceiver 19 may be configured to operate to operate at a frequency of 13.56 MHz and may have a communication range of approximately 4 cm.

In some embodiments of the invention the first apparatus 10 may also comprise a further transceiver 21. The further transceiver 21 may be any means which enables further communication link to be established between the first apparatus 10 and a second apparatus 20 in addition to, or in replacement of, the near field communication link 30.

The controller 7 may be configured to provide data to the further transceiver 21 for transmission over the further communication link. The controller 7 may also be configured to decode radio signals received by the further transceiver 21 into information. The received information may be stored in the memory 5. The controller 7 may also be configured to present the information to a user via the output device 15.

The further transceiver 21 may be configured to operate in a different frequency band to the near field communication transceiver 19. For example the further transceiver 21 may be configured to operate in a Bluetooth (2400-2483.5 MHz) or WLAN (2400-2483.5 MHz) frequency band.

The communication range of the further transceiver 21 may be longer than the communication range of the near field transceiver 19. For example, the further transceiver 21 may have a communication range in the order of 10 m. This enables the first apparatus 10 to maintain a communication link with a second apparatus 20 even after the first apparatus 10 has moved out of the near field communication range of the second apparatus 20.

It is to be appreciated that in some embodiments of the invention only a single transceiver may be provided and this may be configured to provide both a near field communication link 30 and a further communication link. It is also to be appreciated that separate transmitters and receivers may be provided rather than transceivers.

FIG. 3 schematically illustrates a second apparatus 20 according to an embodiment of the invention. Only features referred to in the following description are illustrated. It should, however, be understood that the second apparatus 20 may comprise additional features that are not illustrated.

As mentioned above the second apparatus 20 may be any apparatus which provides an output to a user. For example the second apparatus 20 may be an electronic apparatus such as a television or a stereo system or a non-electronic apparatus with a controller configure to control the output of the second apparatus 20 such as a sauna or a gas central heating system.

The illustrated second apparatus 20 comprises: a controller 35, an output device 39 and a near field communication transceiver 41. In some embodiments of the invention the second apparatus 20 may also comprise a further transceiver 43.

In the illustrated embodiment the controller 35 comprises a processor 33 and a memory 31.

As with the first apparatus 10, the controller 35 of the second apparatus 20 provides means for controlling the second apparatus 20 and may be implemented using instructions that enable hardware functionality, for example, by using executable computer program instructions 47 in a general-purpose or special-purpose processor 33 that may be stored on a computer readable storage medium 51 (e.g. disk, memory etc) to be executed by such a processor 33.

The processor 33 is configured to provide output commands to the output device 39. The processor 33 is also configured to write to and read from the memory 37.

The output device 39 may comprise any means of providing an output. The output device 39 may comprise a plurality of different means of providing an output. For example, in embodiments where the second apparatus 20 is a television the output device may comprise a display configured to display images and an audio output device configured to provide an accompanying audio output.

The output device 39 may be an electronic device, for example, the output device may be an electronic display. Alternatively the output device 39 may be non-electronic, for example the output device 39 may be a sauna or a central heating system and the output provided may be an increase or a decrease in temperature.

The memory 37 stores a computer program 45 comprising computer program instructions 47 that control the operation of the second apparatus 20 when loaded into the processor 33. The computer program instructions 47 provide the logic and routines that enables the second apparatus 20 to perform the methods illustrated in FIGS. 4 and 5. The processor 33 by reading the memory 37 is able to load and execute the computer program 45.

The computer program instructions 45 may provide computer readable program means for decoding data received from the first apparatus 10 to retrieve information input at the first apparatus 10.

The computer program instructions 45 may also provide computer readable program means for controlling the second apparatus 20 in accordance with the retrieved information.

The computer program 45 may arrive at the second apparatus 20 via any suitable delivery mechanism 49, 51. The delivery mechanism 49, 51 may be, for example, a computer-readable storage medium, a computer program product 51, a memory device, a record medium such as a CD-ROM or DVD, an article of manufacture that tangibly embodies the computer program 45. The delivery mechanism may be a signal 49 configured to reliably transfer the computer program 45. The second apparatus 20 may propagate or transmit the computer program 45 as a computer data signal.

The memory 37 also stores information 53. The information 53 may comprise information which has been received by the transceivers 41, 43. The information 53 may be used to enable the processor 33 to provide output commands to the output device 39.

Although the memory 37 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device.

The near field communication transceiver 41 may be any means which enables a near field communication link 30 to be established between the second apparatus 20 and a first apparatus 10 as illustrated in FIG. 2.

The controller 35 may be configured to provide data to the near field communication transceiver 41 for transmission over the near field communication link 30. The controller 35 may also be configured to decode radio signals received by the near field communication transceiver 41 into information. As mentioned above the received information may be stored in the memory 37.

The data transmitted via the near field communication transceiver 41 may enable the second apparatus 20 to be identified. The data received by the near field communication transceiver 41 may enable a first apparatus 10 to be identified.

The near field communication transceiver 41 may be configured to operate to operate at a frequency of 13.56 MHz and may have a communication range of approximately 4 cm.

In some embodiments of the invention the second apparatus 20 may also comprise a further transceiver 43. The further transceiver 43 may be any means which enables further communication link to be established between the second apparatus 20 and a first apparatus 10 in addition to, or in replacement of, the near field communication link 30.

The controller 35 may be configured to provide data to the further transceiver 43 for transmission over the further communication link. The controller 35 may also be configured to decode radio signals received by the further transceiver 43 into information. The received information may be stored in the memory 37. The controller 35 may also be configured to retrieve information from the received data and use the retrieved information to provide output commands to the output device 15.

The further transceiver 43 may be configured to operate in a different frequency band to the near field communication transceiver 41. For example the further transceiver 43 may be configured to operate in a Bluetooth (2400-2483.5 MHz) or WLAN (2400-2483.5 MHz) frequency band.

The communication range of the further transceiver 43 may be longer than the communication range of the near field transceiver 41. For example, the further transceiver 43 may have a communication range in the order of 10 m which enables the first apparatus 10 to maintain a communication link with the second apparatus 20 even after the first apparatus 10 has moved out of the near field communication range of the second apparatus 20.

It is to be appreciated that in some embodiments of the invention only a single transceiver may be provided and this may be configured to provide both a near field communication link 30 and a further communication link. It is also to be appreciated that separate transmitters and receivers may be provided rather than transceivers.

Figure 4:
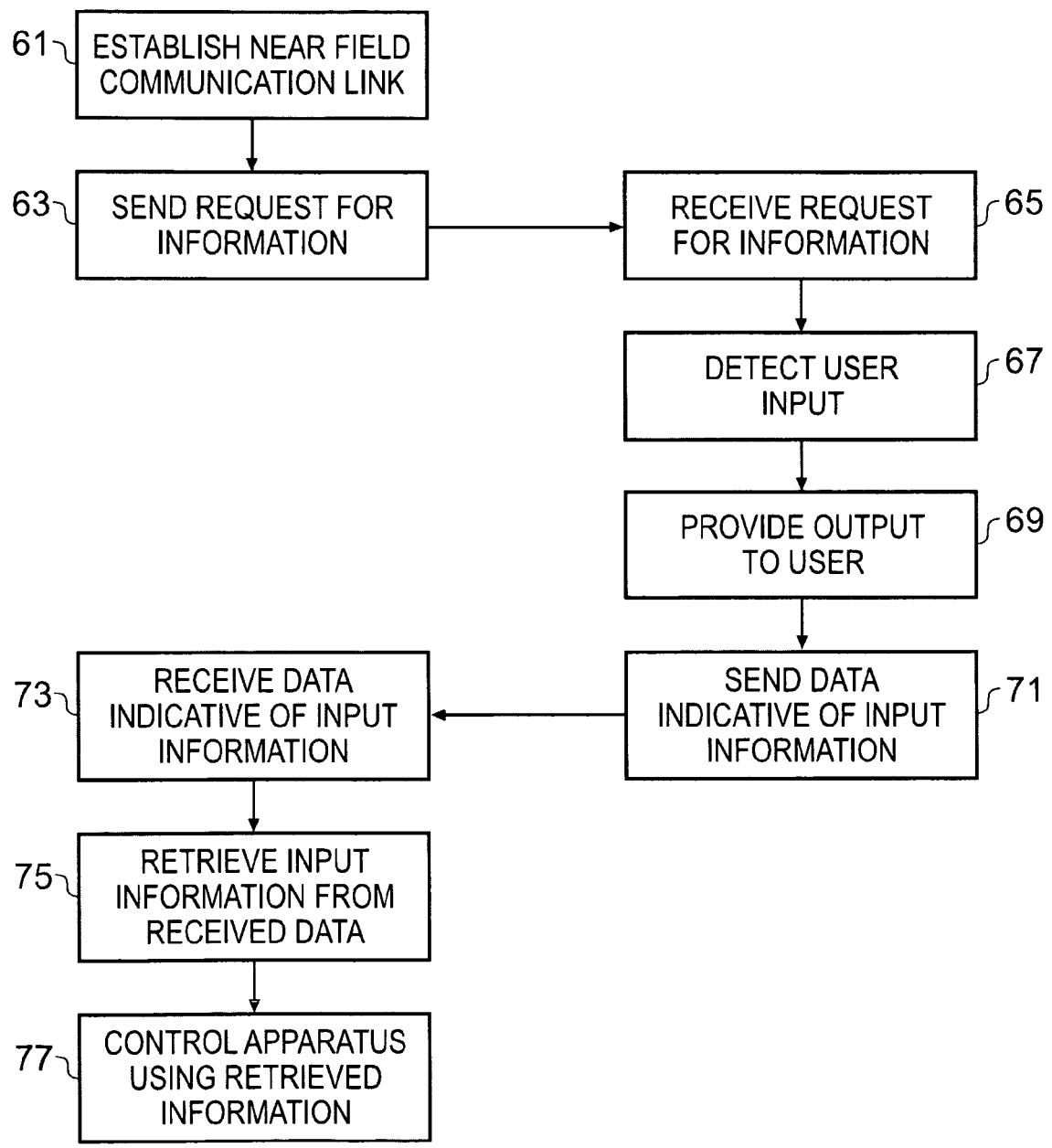
FIG. 4 illustrates a flow chart showing method blocks of an embodiment of the invention.

A method of enabling information input at the first apparatus 10 to be used to control a second apparatus 20, according to embodiments of the invention, is illustrated schematically in FIG. 4.

In the illustrated embodiment steps 61, 63, 73, 75 and 77 occur at a second apparatus 20 and steps 65, 67, 69 and 71 occur at the first apparatus 10.

At block 61 a near field communication link 30 is established between the first apparatus 10 and a second apparatus 20. In the illustrated embodiment block 61 is illustrated as occurring at the second apparatus 20. It is to be appreciated that establishing 61 a communication link 30 may involve steps being carried out by both the first apparatus 10 and the second apparatus 20.

The near field communication link 30 may be established 61 automatically, without the need for a specific user input, whenever the first apparatus 10 is moved into the near field communication range of a second apparatus 20. In some embodiments of the invention the first apparatus 10 may have to make physical contact with the second apparatus 20 in order to enable a near field communications link 30 to be established. For example, a user may have to tap the second apparatus 20 with the first apparatus 10 to enable the near field communication link 30 to be established.

The establishing 61 of the near field communication link 30 may comprise data which enables the first apparatus 10 to be identified being transmitted from the first apparatus 10 to the second apparatus 20. The establishing 61 of the near field communication link 30 may also comprise data which enables the second apparatus 20 to be identified being transmitted from the second apparatus 20 to the first apparatus 10.

In some embodiments of the invention, once the near field communication link 30 has been established further communication link may also be established. The further communication link may be in replacement of or in addition to the near field communication link 30. The near field communication link 30 may be used to transmit data to enable the further communication link to be established. As mentioned above the further communication link may have a longer communication range than the near field communication link 30. This enables the first apparatus 10 and the second apparatus 20 to maintain a communication link even when the first apparatus 10 moves out of the near field communication range of the second apparatus 20.

The further communication link may also enable the first apparatus 10 to communicate in a peer to peer network comprising a plurality of second apparatus 20.

At block 63 the second apparatus 20 sends a request for control information to the first apparatus 10. The request for information may be sent via the near field communication link 30 or via a further communication link.

The request for control information may comprise additional information. The additional information may define a format in which data indicative of the control information is to be transmitted. The additional information may enable the first apparatus 10 to convert information input by the user of the first apparatus 10 into data in the correct format so that the data can be decoded by the second apparatus 20 to retrieve the input information. The additional information may also enable the first apparatus 10 to provide an indication to the user of the first apparatus 10 of how the input information may be used to control the second apparatus 20.

At block 65 the request for control information, is received by the first apparatus 10. In response to the receipt of the request for control information an indication may be presented via the output device 15 that control information has been requested from the second apparatus 20. For example text may be displayed on a display of the user output device 15 indicating a control input is required. The presented information may identify the second apparatus 20. For example it may identify what type of apparatus the second apparatus 20 is.

The received request may also comprise additional information as mentioned above. The additional information which is received may be stored in the memory 5.

At block 67 the user actuates the user input device 17 to input information which may be used to control the second apparatus 20. For example a user may use the keys of a keypad or actuate portions of a touch sensitive display to input control information. Information indicative of the user input that has been made is provided from the user input device 17 to the processor 3.

The processor 3 detects the user input and identifies the user input that has been made and determines the control information that corresponds to the user input. The processor 3 may use additional information 12 that is stored in the memory 5 to determine the control information that corresponds to the user input. The additional information 12 may be information that has been received from the second apparatus 20 as mentioned above.

At block 69 the processor 3 controls the output device 15 to provide an output to the user indicative of the control information corresponding to the user input that was made at block 67. This provides an indication of how the information input by the user will be used to control the second apparatus 20.

For example, in embodiments where the second apparatus 20 is a television the user input may correspond to blacklisting a selected channel and the indication provided to the user may be a piece of text displayed on a display informing the user that the selected channel is now on a blacklist. In embodiments where the second apparatus 20 is a sauna the user input may correspond to increasing or decreasing the temperature within the sauna, in which case an indication of the new temperature within the sauna may be displayed on the display as a number and/or a graphical representation.

Information 12 which enables the processor 3 to control the output device 15 to provide an appropriate output in response to a user input may be stored in the memory 5. The information 12 may be information which is received from the second apparatus 20.

A user may be able to input any number of control pieces of information. For example a user may be able to create an entire profile to determine all of the settings of a second apparatus 20 using the user interface 13 of the first apparatus 10.

In some embodiments of the invention, once the indication of how the input information will be used to control the second apparatus 20 has been provided to the user, the user may be given an opportunity to confirm that they wish to proceed and use the input information to control the second apparatus 20.

The input control information is converted into data indicative of the information. The input control information may be converted into data according to a predetermined format. The predetermined format may have been determined by the second apparatus 20. Information indicative of the predetermined format may have been sent from the second apparatus 20 to the first apparatus 10. In other embodiments of the invention predetermined format may have been determined by the first apparatus 10. In such embodiments the first apparatus 10 may send information to the second apparatus 20 to enable the second apparatus 20 to decode the data to enable the input control information to be retrieved from the data which has been transmitted.

At block 71 the data indicative of the control information which has been input by the user is sent from the first apparatus 10 to the second apparatus 20 information which enables the second apparatus 20 to retrieve the control information from the data may also be sent with the data.

The data indicative of the control information which has been input may be sent 71 via the near field communication link 30 or Via a further communication link.

At block 73 the data indicative of the control information which has been input by a user of the first apparatus 10 is received by the second apparatus 20 and provided to the processor 33 of the second apparatus 20.

At block 75 the processor 33 of the second apparatus 20 decodes the received data to retrieve the input control information. The processor 33 may use a predetermined format to decode the received data. The predetermined format may have been determined by the second apparatus 20. In other embodiments of the invention the predetermined format may have been determined by the first apparatus and the processor 33 may use information which has been received from the first apparatus 10 to decode the received data.

At block 77 the controller 35 of the second apparatus uses the retrieved information to control the second apparatus 20.

The retrieved information may also be stored in the memory 37. The retrieved information may be stored with information which identifies the first apparatus 10 from which the retrieved information was received.

Figure 5:
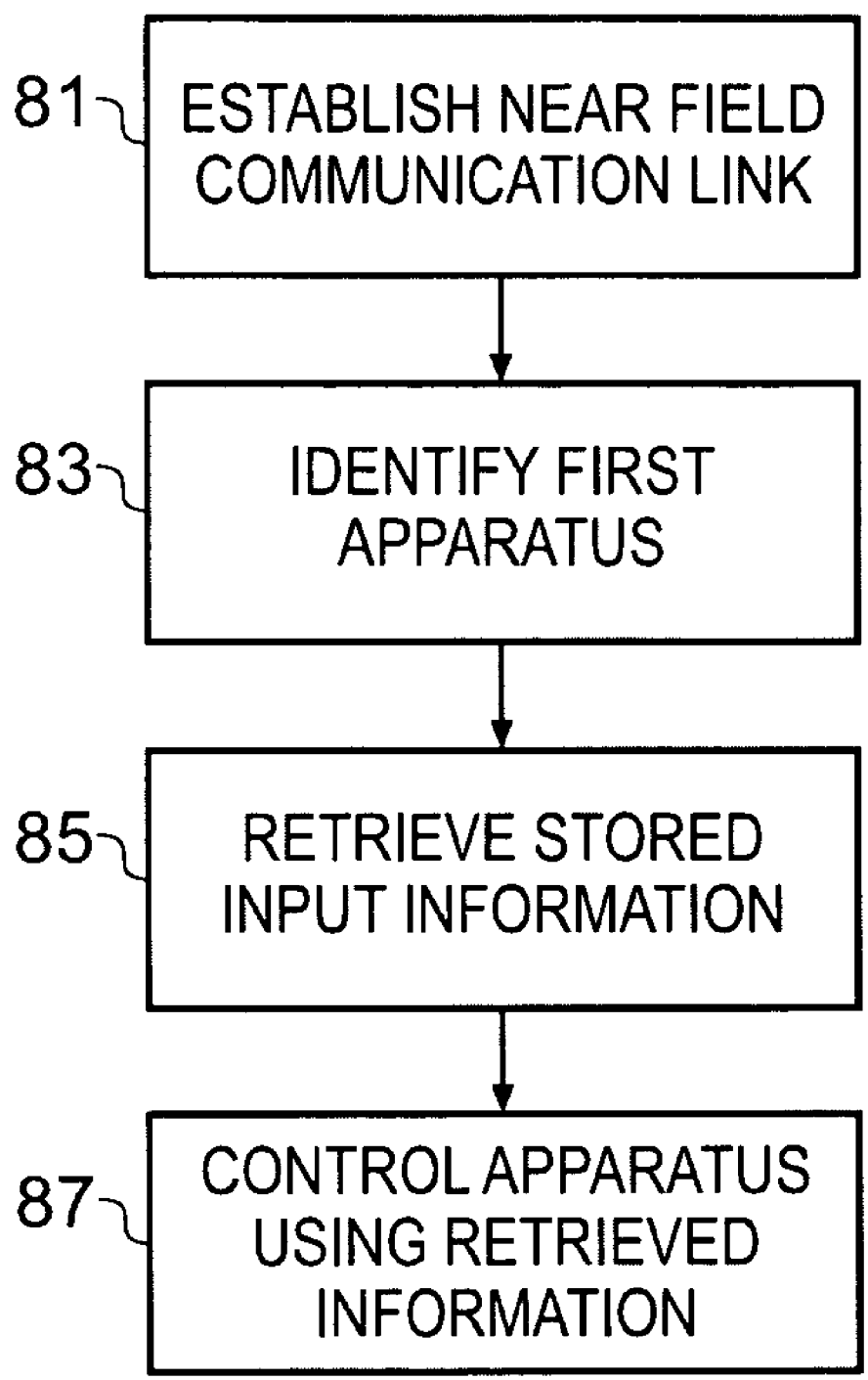
FIG. 5 illustrates a flow chart showing method blocks of an embodiment of the invention.

A method of enabling information input at the first apparatus 10 to be used to control a second apparatus 20, according to another embodiment of the invention, is illustrated schematically in FIG. 5.

In the embodiment illustrated in FIG. 5 all of the blocks occur at the second apparatus 20. In the method illustrated in FIG. 5 the method of FIG. 4 may have already been carried out so that the memory 37 of the second apparatus 20 already stores control information which has been received from the first apparatus 10. The control information may be a profile which determines a plurality of the settings of the second apparatus 20.

At block 81 a near field communication link 30 is established between the first apparatus 10 and a second apparatus 20. In the embodiment illustrated in FIG. 5 the block 81 is illustrated as occurring at the second apparatus 20. It is to be appreciated that establishing 61 a communication link 30 may involve steps being carried out by both the first apparatus 10 and the second apparatus 20.

The near field communication link 30 may be established 81 automatically, without the need for a specific user input, whenever the first apparatus 10 is moved into the near field communication range of a second apparatus 20. In some embodiments of the invention the first apparatus 10 may have to make physical contact with the second apparatus 20 in order to enable a near field communications link 30 to be established. Fore example a user may have to tap the second apparatus 20 with the first apparatus 10 to enable the near field communication link 30 to be established.

At block 83 the second apparatus 20 identifies the first apparatus 10. The first apparatus may be identified by information which has been transmitted via the near field communication link 30.

Once the first apparatus 10 has been identified the processor 33 of the second apparatus 20 will, at block 85, retrieve stored control information which has been received from the first apparatus 10 during a previous communication session and stored in the memory 37.

Once the control information has been retrieved the second apparatus 20 is controlled according the retrieved control information.

In both the embodiment illustrated in FIG. 4 and the embodiment illustrated in FIG. 5 the second apparatus will continue to operate according to the retrieved information until an interrupt is detected. The interrupt may be the re-establishment of a near field communication link with the first apparatus 10.

In response to the re-establishment of a near field communication link with the first apparatus 10 the second apparatus 10 may revert to a default mode of operation. In some embodiments of the invention the default mode of operation may be a low power, for example where the second apparatus 20 is a television, the default mode of operation may be a stand by mode.

In other embodiments of the invention the interrupt may be the establishment of a near field communication link 30 with a different first apparatus 10. In response to the establishment of a near field communication link 30 with a different first apparatus 10 the second apparatus 20 may operate in accordance with control information received from the different first apparatus 10.

The blocks illustrated in the FIGS. 4 and 5 may represent steps in a method and/or sections of code in the computer program 9, 45. The illustration of a particular order to the blocks does not necessarily imply that there is a required or preferred order for the blocks and the order and arrangement of the block may be varied. For example in some embodiments of the invention the user may be able to input the control information into the first apparatus 10 before the near field communication link is established.

Furthermore, it may be possible for some steps to be omitted.

Embodiments of the invention provide the advantage that a single first apparatus 10 may be configured to enable a user to control a plurality of second apparatus 20. This enables a user to easily control a plurality of second apparatus using a single first apparatus. This means that a user only has to be familiar with a single user interface which may be particularly advantageous as if the interfaces of the other apparatus are very different to each other as this may be confusing.

Also embodiments of the invention provide the advantage that a single second apparatus 20 maybe controlled by any number of different first apparatus 10. Each potential user of a second apparatus 20 can create a preferred profile for their preferred settings for the second apparatus 20 which may be stored in the second apparatus 20. The user may then be able to use the first apparatus 10 to activate their preferred profile. This may be advantageous where a second apparatus 20 may have a plurality of potential different users, for example, in a household where a plurality of different people may which to use apparatus such as a television or a toaster.

Also once the control information has been sent from the first apparatus 10 it may be stored in the second apparatus 20 and retrieved in response to the establishment of a near field communication link 30 as described above in relation to FIG. 5. This provides the advantage that the second apparatus 20 may be configured to operate in accordance with the control information without any user input from the user of the first apparatus 10 other than bringing the first apparatus within the near field communication range of the second apparatus 20. This is a very simple way of enabling a user to control a remote apparatus.

Using a near field communication link 30 to identify the apparatus 10 and begin and end control sessions provides the advantage that the link is secure. Also they require the first apparatus 10 to be brought within close proximity of the second apparatus 20 so this reduces the chance of a user inadvertently activating a communication session. It also makes it clear to a user which second apparatus 20 they are controlling because they must physically move the first apparatus 10 within the near field communication range of the second apparatus.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A system comprising:
a first mobile apparatus and a second apparatus where the first mobile apparatus and the second apparatus are remote from each other;
the first mobile apparatus comprising a near field communication transceiver configured to enable a near field communication link to be established with the second apparatus, a user interface configured to enable a user to input information into the first mobile apparatus wherein the input information enables control of the second apparatus and the user interface is also configured to provide an indication of how the input information may be used to control the second apparatus and a transmitter configured to send data dependent upon the input information to the second apparatus; and
the second apparatus comprising a near field communication transceiver configured to enable a near field communications link to be established with the first mobile apparatus, a receiver configured to receive data from the first mobile apparatus where the received data is dependent upon information input at the first mobile apparatus and a controller configured to decode the received data to retrieve the information input at the first mobile apparatus and to control the second apparatus to provide an output directly to a user of the second apparatus wherein the output is provided dependent upon the retrieved information.

2. A system as claimed in claim 1 wherein the first mobile apparatus is configured to store information for sending with the data dependent upon the input information to enable the input information to be retrieved from the data received at the second apparatus.

3. A system as claimed in claim 1 wherein the first mobile apparatus is configured to convert the input information into data according to a predetermined format to enable the input information to be retrieved from the data received at the second apparatus.

4. A method comprising:
establishing a near field communication link between a first mobile apparatus and a second apparatus, where the first mobile apparatus is remote from the second apparatus;
enabling information to be input at the first mobile apparatus to enable control of the remote apparatus;
providing an indication to the user of the first mobile apparatus of how the input information may be used to control the second apparatus;
sending data dependent upon the input information from the first mobile apparatus to the second apparatus to enable control of the second apparatus;
receiving the data dependent upon the input information at the second apparatus;
decoding the received data to retrieve the input information; and
controlling the second apparatus to provide an output directly to a user of the second apparatus wherein the output is provided dependent upon the retrieved information.

5. A method as claimed in claim 4 comprising sending information from the first mobile apparatus to the second apparatus to enable the input information to be retrieved from the data received at the second apparatus.

6. A method as claimed in claim 4 comprising converting the information input at the first mobile apparatus into data according to a predetermined format to enable the input information to be retrieved from the data received at the second apparatus.

7. An apparatus comprising:
a near field communication transceiver configured to enable a near field communication link to be established with a remote apparatus;
a user interface configured to enable a user to input information into the apparatus wherein the input information enables control of the remote apparatus and the user interface is also configured to provide an indication of how the input information may be used to control the remote apparatus; and
a transmitter configured to send data dependent upon the input information to the remote apparatus to enable the input information to be used to control the remote apparatus to provide an output directly to a user of the remote apparatus wherein the output is provided dependent upon the input information.

8. An apparatus as claimed in claim 7 wherein the apparatus is configured to store information for sending with the data dependent upon the input information to enable the input information to be retrieved from the data received at the remote apparatus.

9. An apparatus as claimed in claim 7 wherein the apparatus is configured to convert the input information into data according to a predetermined format to enable the input information to be retrieved from the data received at the remote apparatus.

10. An apparatus as claimed in claim 9 wherein the apparatus is configured to store information indicative of the predetermined format.

11. An apparatus as claimed in claim 10 wherein the apparatus is configured to receive the information indicative of the predetermined format from the remote apparatus.

12. An apparatus as claimed in claim 7 wherein the near field communication link enables a second communication link to be established between the apparatus and the remote apparatus where the second communication link has a longer range than the near field communication link.

13. An apparatus as claimed in claim 12 wherein the data dependent upon the input information is sent over the second communication link.

14. A method comprising:
    establishing a near field communication link between a first apparatus and a second apparatus, where the first apparatus is remote from the second apparatus;
    enabling information to be input at the first apparatus to enable control of the second apparatus;
    providing an indication to the user of the first apparatus of how the input information may be used to control the second apparatus; and
    sending data dependent upon the input information from the first apparatus to the second apparatus to enable the input information to be used to control the second apparatus to provide an output directly to a user of the second apparatus wherein the output is provided dependent upon the input information.

15. A method as claimed in claim 14 comprising sending information with the data dependent upon the input information to enable the input information to be retrieved from the data received at the second apparatus.

16. A method as claimed in claim 14 comprising converting the input information into data according to a predetermined format to enable the input information to be retrieved from the data received at the second apparatus.

17. A method as claimed in claim 14 comprising establishing a second communication link to be established between the first apparatus and the second apparatus where the second communication link has a longer range than the near field communication link.

18. A method as claimed in claim 17 wherein the data dependent upon the input information is sent over the second communication link.

19. A non-transitory physical entity embodying a computer program comprising computer program instruction means configured to control an apparatus, the apparatus comprising a near field communication transceiver configured to enable a near field communication link to be established with a remote apparatus and a user interface, the program instructions providing, when loaded into a processor;
    means for enabling information to be input at the apparatus to enable control of the remote apparatus;
    means for providing an indication to a user of the apparatus of how the input information may be used to control the remote apparatus; and
    means for sending data dependent upon the input information from the apparatus to the remote apparatus to enable the input information to be used to control the remote apparatus to provide an output directly to a user of the remote apparatus wherein the output is provided dependent upon the input information.

20. A non-transitory physical entity embodying a computer program comprising program instructions for causing a computer to perform the method of claim 14.

21. A physical entity as in claim 19 wherein the computer program is encoded on a tangible non-transitory computer readable medium.

* * * * *